US011433758B2

(12) United States Patent
Marietta

(10) Patent No.: US 11,433,758 B2
(45) Date of Patent: Sep. 6, 2022

(54) RECREATIONAL OFF-HIGHWAY VEHICLE WITH VEHICLE FRONT STRUCTURE

(71) Applicant: YAMAHA HATSUDOKI KABUSHIKI KAISHA, Shizuoka (JP)

(72) Inventor: Kyle A Marietta, Newnan, GA (US)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 384 days.

(21) Appl. No.: 16/523,082

(22) Filed: Jul. 26, 2019

(65) Prior Publication Data

US 2021/0023936 A1 Jan. 28, 2021

(51) Int. Cl.
*B60K 11/04* (2006.01)
*B60Q 1/04* (2006.01)
*B62D 25/08* (2006.01)
*B60K 13/02* (2006.01)
*B60R 19/52* (2006.01)
*B62D 25/16* (2006.01)
*F01M 5/00* (2006.01)
*F01P 11/08* (2006.01)
*B62D 25/10* (2006.01)

(52) U.S. Cl.
CPC .............. *B60K 11/04* (2013.01); *B60K 13/02* (2013.01); *B60Q 1/0408* (2013.01); *B60R 19/52* (2013.01); *B62D 25/08* (2013.01); *B62D 25/105* (2013.01); *B62D 25/168* (2013.01); *F01M 5/002* (2013.01); *F01P 11/08* (2013.01); *B60R 2019/525* (2013.01); *B60Y 2200/20* (2013.01)

(58) Field of Classification Search
CPC ......... B60K 11/04; B60K 13/02; B60R 19/52; B60R 2019/525; B60Q 1/0408; B60Q 1/0035; B60Q 1/0041
See application file for complete search history.

(56) References Cited

U.S. PATENT DOCUMENTS

| 4,758,932 | A | * | 7/1988 | Coons | B60Q 1/0041 362/297 |
| 5,046,550 | A | * | 9/1991 | Boll | B60K 13/02 165/41 |
| 5,353,204 | A | * | 10/1994 | Kawamura | B60Q 1/0041 362/299 |
| 5,546,284 | A | * | 8/1996 | Harada | F21S 41/29 362/544 |
| 5,681,104 | A | * | 10/1997 | Chinniah | F21S 41/43 362/538 |

(Continued)

*Primary Examiner* — Frank B Vanaman
(74) *Attorney, Agent, or Firm* — Global IP Counselors, LLP

(57) ABSTRACT

A recreational off-highway vehicle includes a vehicle frame, a plurality of wheels, a drive source, a vehicle body and a pair of headlights. The vehicle frame includes a front frame, a rear frame and an intermediate frame defining an open passenger compartment between the front and rear frames. The wheels support the vehicle frame. At least one of the wheels is a drive wheel. The drive source supported by the vehicle frame. The vehicle body is provided to the vehicle frame. The vehicle body includes a front grille panel that has an air intake area defined by a plurality of intake air openings. The headlights are located primarily at a middle point of the front grille panel with respect to a vertical direction of the recreational off-highway vehicle.

18 Claims, 12 Drawing Sheets

(56) References Cited

U.S. PATENT DOCUMENTS

| | | | | |
|---|---|---|---|---|
| 6,210,024 | B1* | 4/2001 | Shida | F21S 41/295 |
| | | | | 362/345 |
| 6,799,872 | B2* | 10/2004 | Kawai | B60Q 1/0035 |
| | | | | 362/475 |
| 9,440,671 | B2 | 9/2016 | Schlangen et al. | |
| 2004/0108097 | A1* | 6/2004 | Ueda | B60K 11/04 |
| | | | | 165/42 |
| 2004/0216934 | A1* | 11/2004 | Tomiyama | B60K 11/04 |
| | | | | 180/68.1 |
| 2005/0056049 | A1* | 3/2005 | Sanada | F25B 39/04 |
| | | | | 62/507 |
| 2008/0239736 | A1* | 10/2008 | Aoki | B60Q 1/0041 |
| | | | | 362/475 |
| 2010/0147613 | A1* | 6/2010 | Jansen | B62D 25/10 |
| | | | | 180/69.2 |
| 2012/0031688 | A1* | 2/2012 | Safranski | B60K 17/348 |
| | | | | 180/54.1 |
| 2013/0063966 | A1* | 3/2013 | Sumi | F21S 43/241 |
| | | | | 362/602 |
| 2013/0319785 | A1* | 12/2013 | Spindler | B60K 17/08 |
| | | | | 180/292 |
| 2015/0061275 | A1 | 3/2015 | Deckard et al. | |
| 2016/0347137 | A1 | 12/2016 | Despres-Nadeau et al. | |
| 2016/0347350 | A1 | 12/2016 | Heon et al. | |
| 2017/0080977 | A1 | 3/2017 | Schroeder et al. | |

\* cited by examiner

RECREATIONAL OFF-HIGHWAY VEHICLE WITH VEHICLE FRONT STRUCTURE

BACKGROUND

Field of the Invention

The present invention generally relates to the field of recreational off-highway vehicles. More specifically, the present invention relates to a vehicle front structure for a recreational off-highway vehicle.

Background Information

Generally, recreational off-highway vehicles are designed to be operated over rough terrain. Basically, a recreational off-highway vehicle is considered to be any small vehicle that is not street legal. In other words, a recreational off-highway vehicle is not equipped and licensed for use on public roads, while a street legal vehicle is equipped and licensed for use on public roads. These recreational off-highway vehicles are often driven on uneven terrain such as rough roads, steep inclines and declines. As a consequence of these considerations, the design of a recreational off-highway vehicle can be quite different from vehicles designed for driving on paved roads.

Various types of recreational off-highway vehicles that are designed to be primarily driven on unpaved surfaces and typically have one or more seats. One example of a recreational off-highway vehicles is a side-by-side off-road vehicle in which the driver and a passenger are seated side-by-side. Some side-by-side recreational off-road vehicles also have a second row of seats to accommodate one or more additional passengers. These recreational off-highway vehicles typically have a frame with an open cockpit, a roll cage, a steering wheel and four wheels. In the case of these side-by-side recreational off-highway vehicles, a drive source such as an internal combustion engine is utilized to drive one or more of the wheels. Typically, the drive source will be configured to drive two of the wheels or all four of the wheels. Typically, the engine is provided with a transmission that transfers power to an output shaft from a crankshaft of the engine. The output shaft drives the wheels through a drivetrain.

SUMMARY

Generally, the present disclosure is directed to various features of a vehicle front structure of a recreational off-highway vehicle. In recreational off-highway vehicles, the front end structure of a recreational off-highway vehicle needs to be configured to provide for headlights as well as a grille that provides for cooling air.

Accordingly, one object of the present disclosure is directed to an improved the front end structure of a recreational off-highway vehicle.

In accordance with one aspect of the present disclosure, a recreational off-highway vehicle is provided that basically comprises a vehicle frame, a plurality of wheels, a drive source, a vehicle body and a pair of headlights. The vehicle frame includes a front frame, a rear frame and an intermediate frame defining an open passenger compartment between the front and rear frames. The wheels support the vehicle frame. At least one of the wheels is a drive wheel. The drive source supported by the vehicle frame. The vehicle body is provided to the vehicle frame. The vehicle body includes a front grille panel that has an air intake area defined by a plurality of intake air openings. The headlights are located primarily at a middle point of the front grille panel with respect to a vertical direction of the recreational off-highway vehicle.

Also, other features, aspects and advantages of the disclosed recreational off-highway vehicle will become apparent to those skilled in the field of manufacturing recreational off-highway vehicles from the following detailed description, which, taken in conjunction with the annexed drawings, discloses several illustrative embodiments of a recreational off-highway vehicle with various features.

BRIEF DESCRIPTION OF THE DRAWINGS

Referring now to the attached drawings which form a part of this original disclosure.

Figure 1:
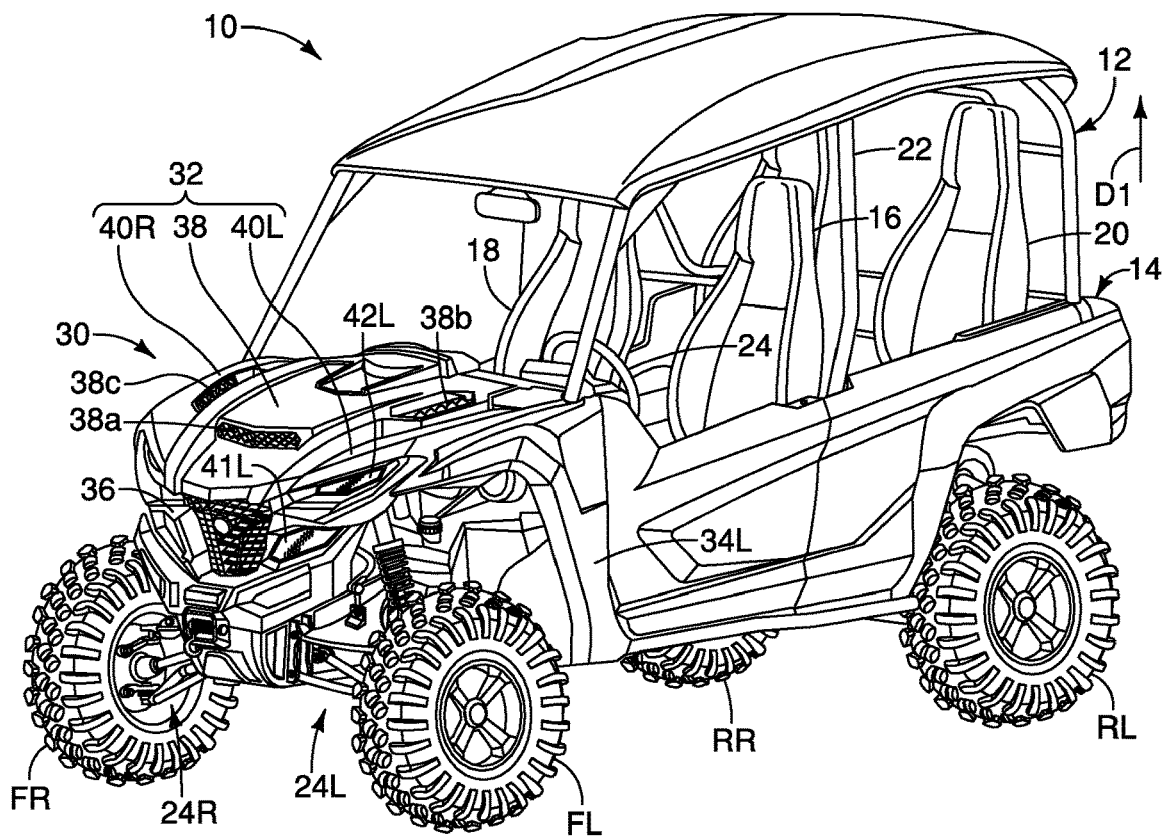
FIG. 1 is a perspective view of a recreational off-highway vehicle having a vehicle front structure in accordance with one illustrative embodiment.

It should be noted that these figures are intended to illustrate the general characteristics of methods, structure and/or materials utilized in certain illustrative embodiment and to supplement the written description provided below. These figures are to reduce scale of the actual recreational off-highway vehicle but may not precisely reflect the precise structural or performance characteristics of any given embodiment. However, the dimensional relationships and the arrangement of the parts of the recreational off-highway vehicle are accurately depicted.

DETAILED DESCRIPTION OF EMBODIMENTS

Selected embodiments will now be explained with reference to the drawings. It will be apparent to those skilled in the recreational off-highway vehicle field from this disclosure that the following descriptions of the embodiments are provided for illustration only and not for the purpose of limiting the invention as defined by the appended claims and their equivalents. Like reference numerals in the drawings denote like similar or identical elements or features, and thus the descriptions of the similar or identical elements or features may be omitted in later embodiments.

Referring initially to FIGS. 1 to 6, a recreational off-highway vehicle 10 is illustrated in accordance with one illustrative embodiment. Here, the recreational off-highway vehicle 10 is a side-by-side recreational off-highway vehicle with rear seating for four people. As used herein, the term "recreational off-highway vehicle" refers to a vehicle that is not street legal (i.e. the off-highway vehicle is not equipped and licensed for use on public road). Of course, recreational off-highway vehicles such as the recreational off-highway vehicle 10 illustrated herein can be also driven on paved surfaces. In other words, in the illustrated embodiment, the vehicle 10 can be classified as a "recreational off-highway vehicle". Hereinafter, for the sake of brevity, the recreational off-highway vehicle 10 will be referred to simply as the vehicle 10.

Figure 2:
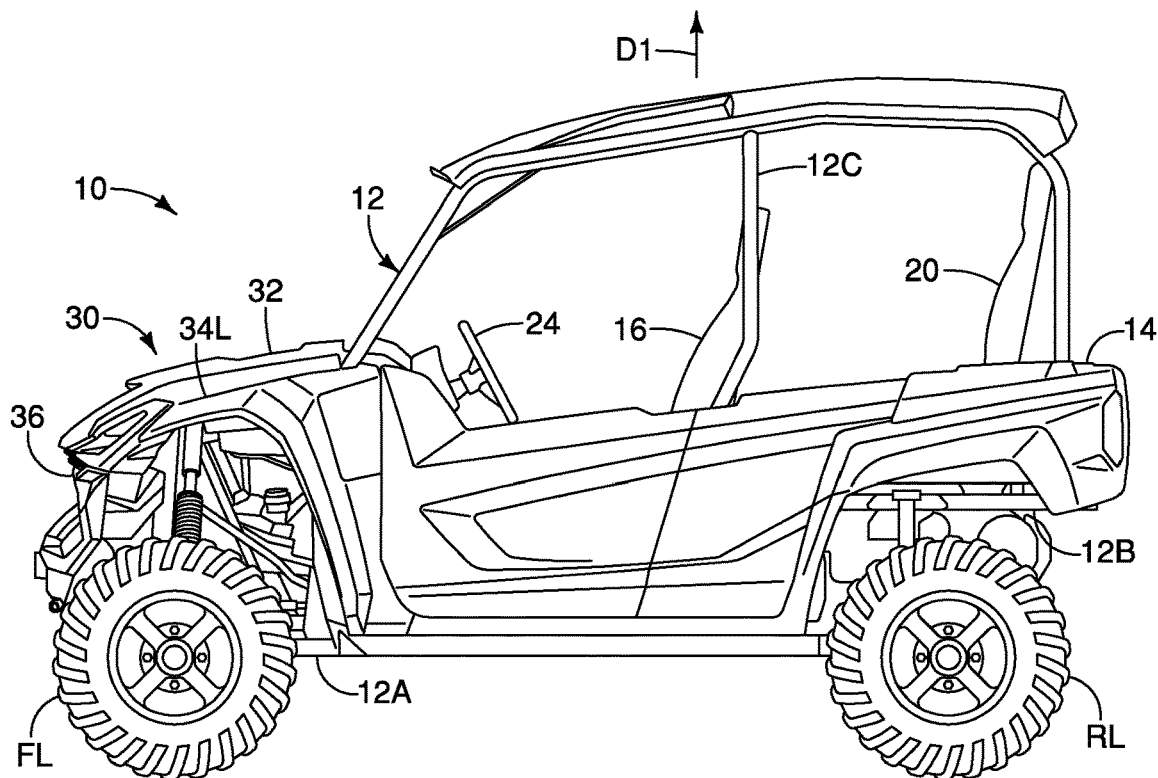
FIG. 2 is a left side elevational view of the recreational off-highway vehicle illustrated in FIG. 1.
Figure 3:
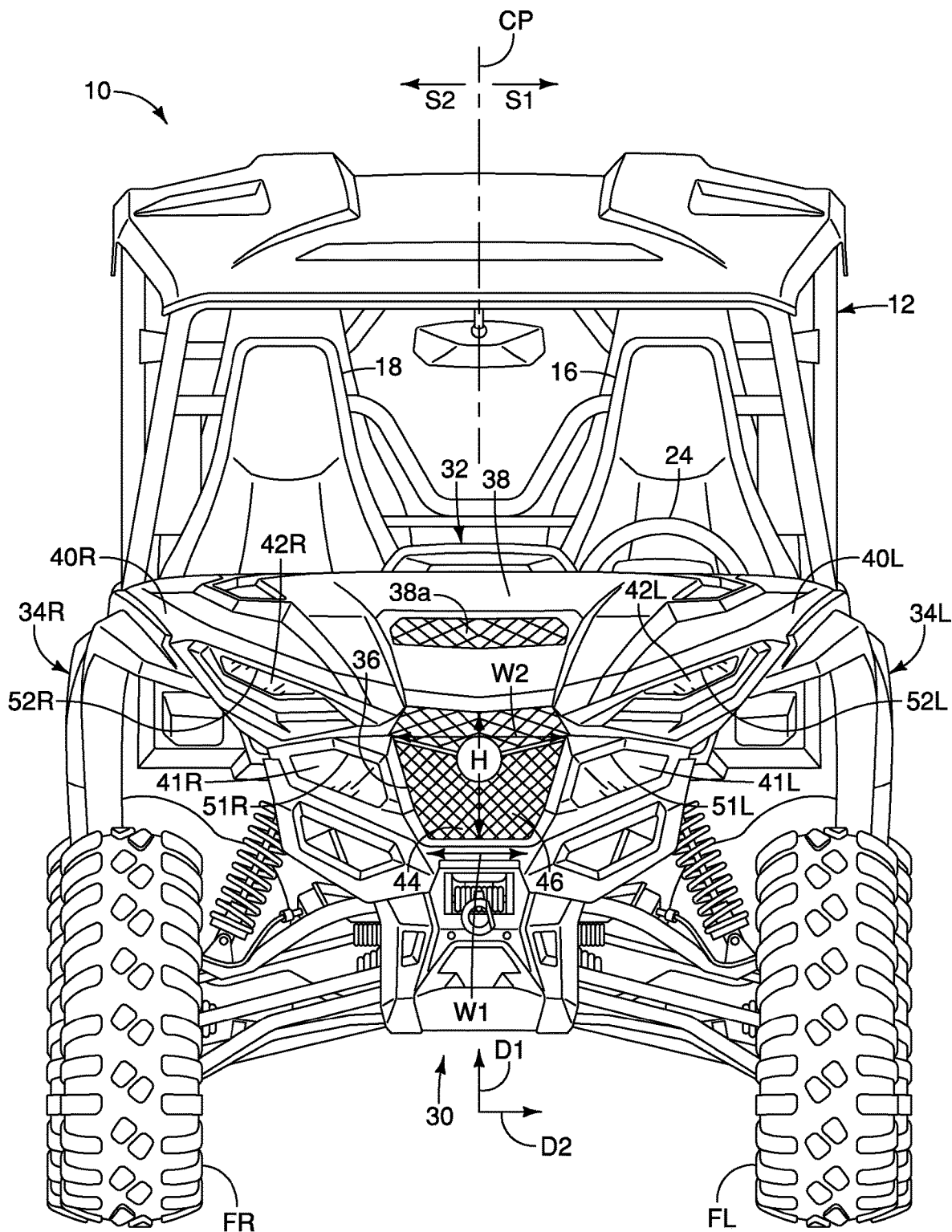
FIG. 3 is a front elevational view of the recreational off-highway vehicle illustrated in FIGS. 1 and 2.
Figure 4:
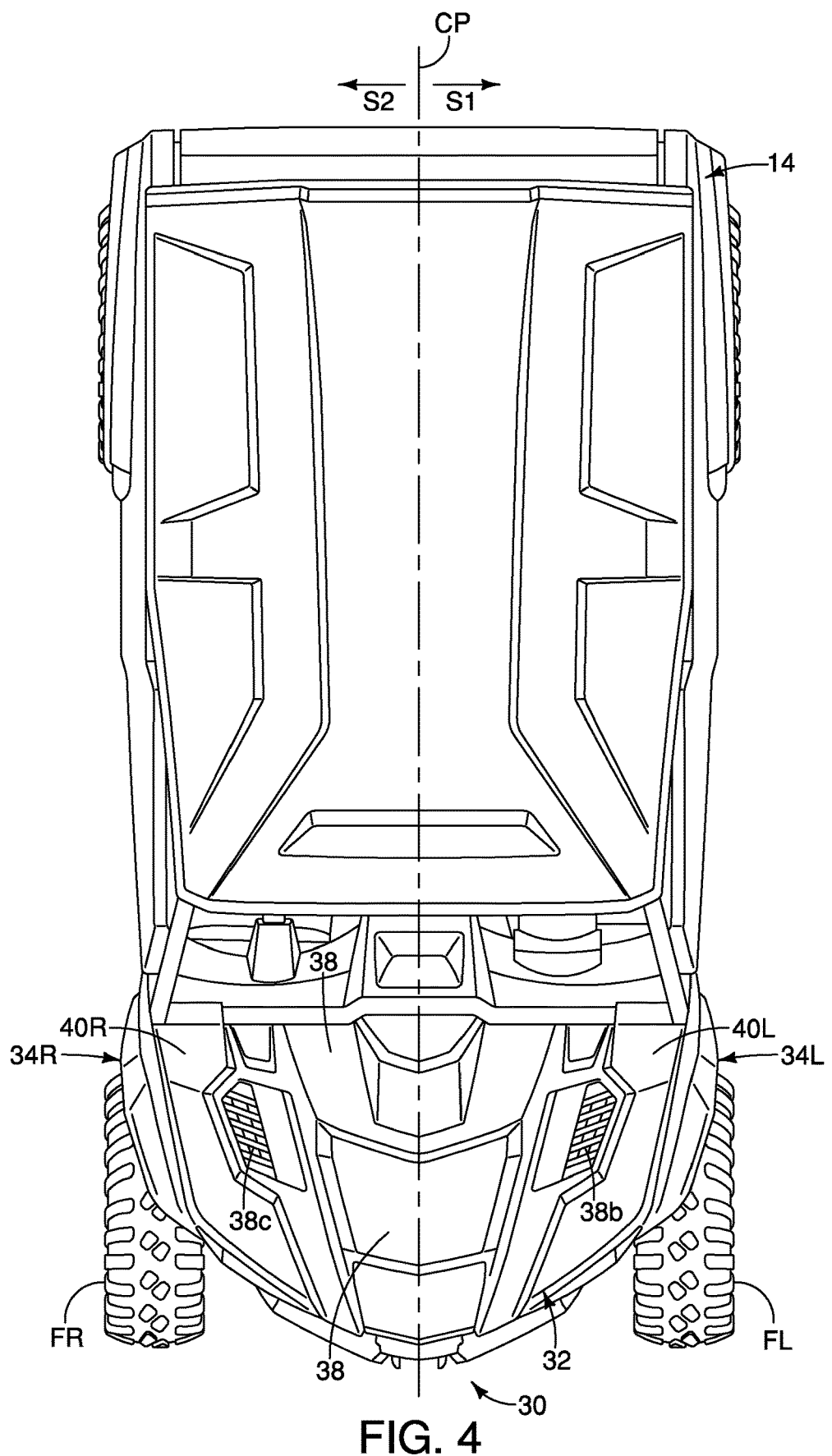
FIG. 4 is a top view of the recreational off-highway vehicle illustrated in FIGS. 1 to 3.

In the following description, the terms "front" and "forward" refer to a direction in which the driver looks straight ahead while in seated driving position. Also, in the following description, the terms "rear," "rearward" and "backward" refer to a direction opposite to the front or forward direction. Further in the following description, the term "lateral side" refer to a portion of the vehicle 10 that is one or the other side of a vertical center plane CP that bisect the vehicle 10 into right and left halves. Thus, as seen in FIG. 2, the vertical center plane CP divides the vehicle 10 into a first lateral side S1 (i.e., the left side in the illustrated embodiment) and a second lateral side S2 (i.e., the right side in the illustrated embodiment). The vertical center plane CP extends in a vehicle longitudinal vehicle direction as indicated in FIG. 3. Also, in the following description, the term "lateral vehicle direction" refer to a side to side direction that is perpendicular to a straightforward driving direction and "vehicle longitudinal vehicle direction" refers a direction that is parallel to a straightforward driving direction.

The vehicle 10 basically comprises a vehicle frame 12, a vehicle body 14, a pair of front wheels FR and FL a pair of rear wheels RR and RL, a driver seat 16, a front passenger seat 18, a first rear passenger seat 20 and a second rear passenger seat 22. The vehicle body 14, the seats 16, 18, 20 and 22 are attached to the vehicle frame 14 in a conventional manner. The front wheels FR and FL are connected to the vehicle frame 12 by a pair of independent front suspensions in a conventional manner, while the rear wheels RR and RL are connected to the vehicle frame 12 by a pair of independent rear suspensions in a conventional manner. While the vehicle 10 includes four seats, it is contemplated that the vehicle 10 can have only one seat.

Also, the vehicle 10 further comprises a steering wheel 24 that is disposed in front of the driver seat 16. The steering wheel 24 is operatively connected to the front wheels FR and FL by a steering column in a conventional manner for turning the front wheels FR and FL in response to turning of the steering wheel 24. In some applications, a control stick can be used in place of the steering wheel 24. Other suitable steering devices also can be used, such as, without limitation, a handlebar, one or more push-buttons, one or more foot pedals and/or the like. Thus, here, the wheels FR and FL are steerable wheels for changing the travel path of the vehicle 10.

The vehicle frame 12 is typically made from a plurality of hollow tubes and a plurality of brackets that are welded to each other. It is contemplated that at least some of the hollow tubes could be replaced by other types of supports such as solid support members and/or beams. While the hollow tubes have a cylindrical cross-section, it is contemplated that cross-sections other than circular. Preferably, the hollow tubes, the beams and the brackets are preferably made of a suitable rigid metallic material such as steel, aluminum, titanium, etc. It is also contemplated that at least some of the hollow tubes, the beams, and the brackets could be made of a non-metallic material, such as reinforced composite materials such as fiber reinforced plastics. It is also contemplated that at least some of the members and brackets could be joined to each other by means other than welding, such as by fastening and bonding for example. It is also contemplated that two or more of the hollow tubes, the beams, and the brackets described below could be cast or otherwise formed as a single component. It is also contemplated that the vehicle frame 12 could have more or less the hollow tubes, the beams, and the brackets than illustrated below depending on the type of materials used, the required strength and rigidity of the vehicle frame 12 and the weight of the components attached to the vehicle frame 12 for example.

Figure 5:
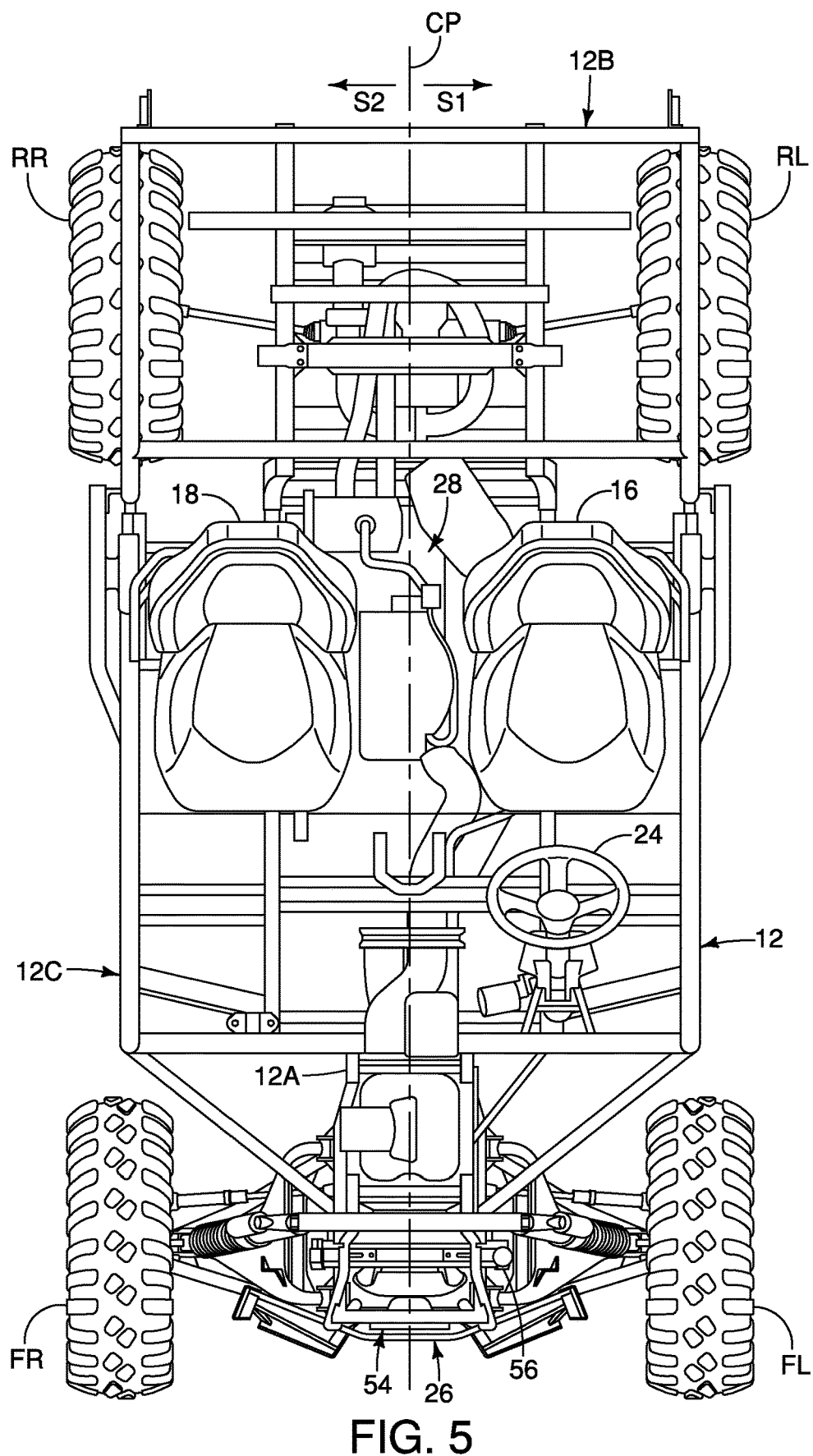
FIG. 5 is a top view of selected parts of the recreational off-highway vehicle illustrated in FIGS. 1 to 4.
Figure 6:
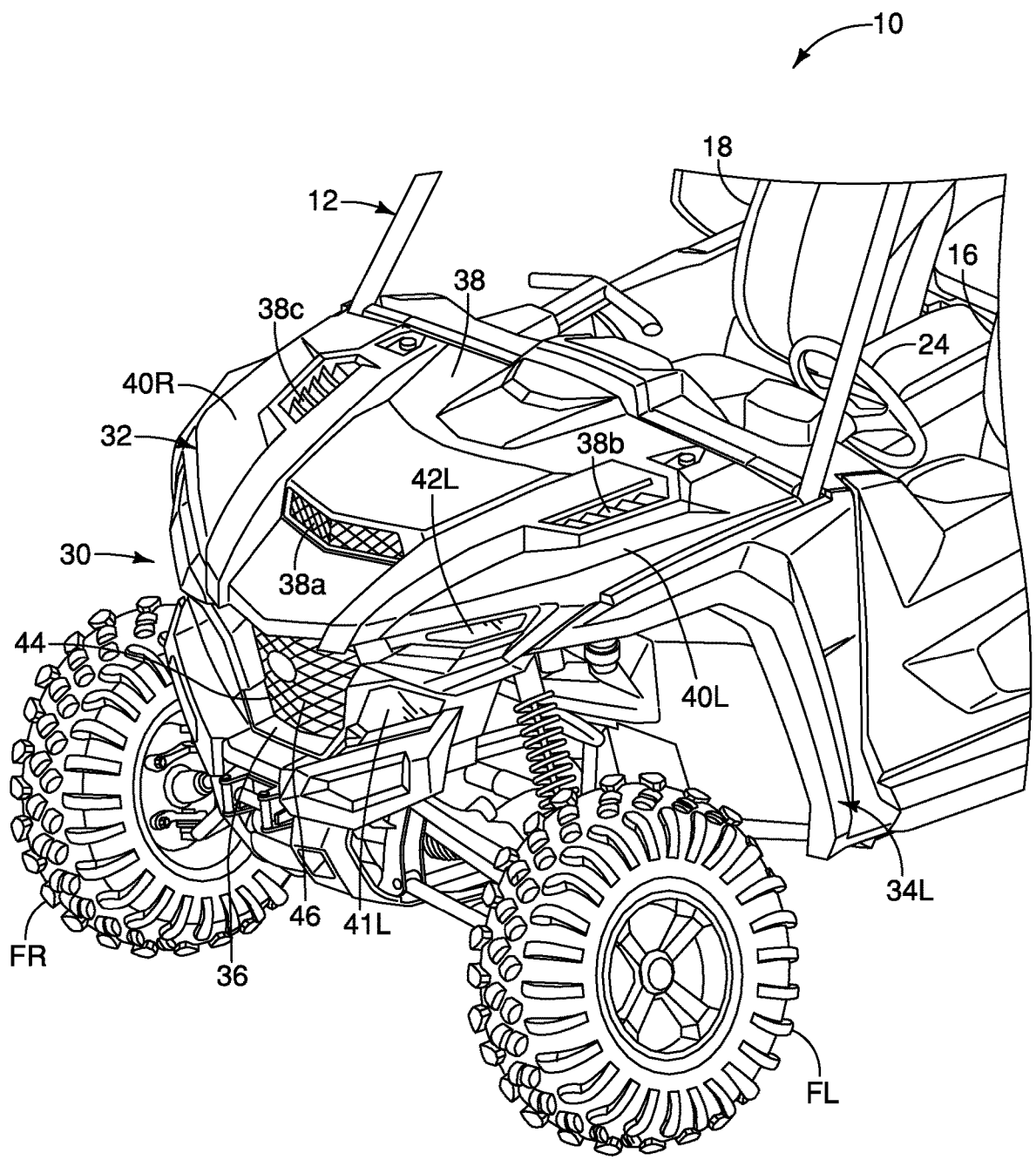
FIG. 6 is a perspective of a front portion of the recreational off-highway vehicle illustrated in FIGS. 1 to 5.
Figure 7:
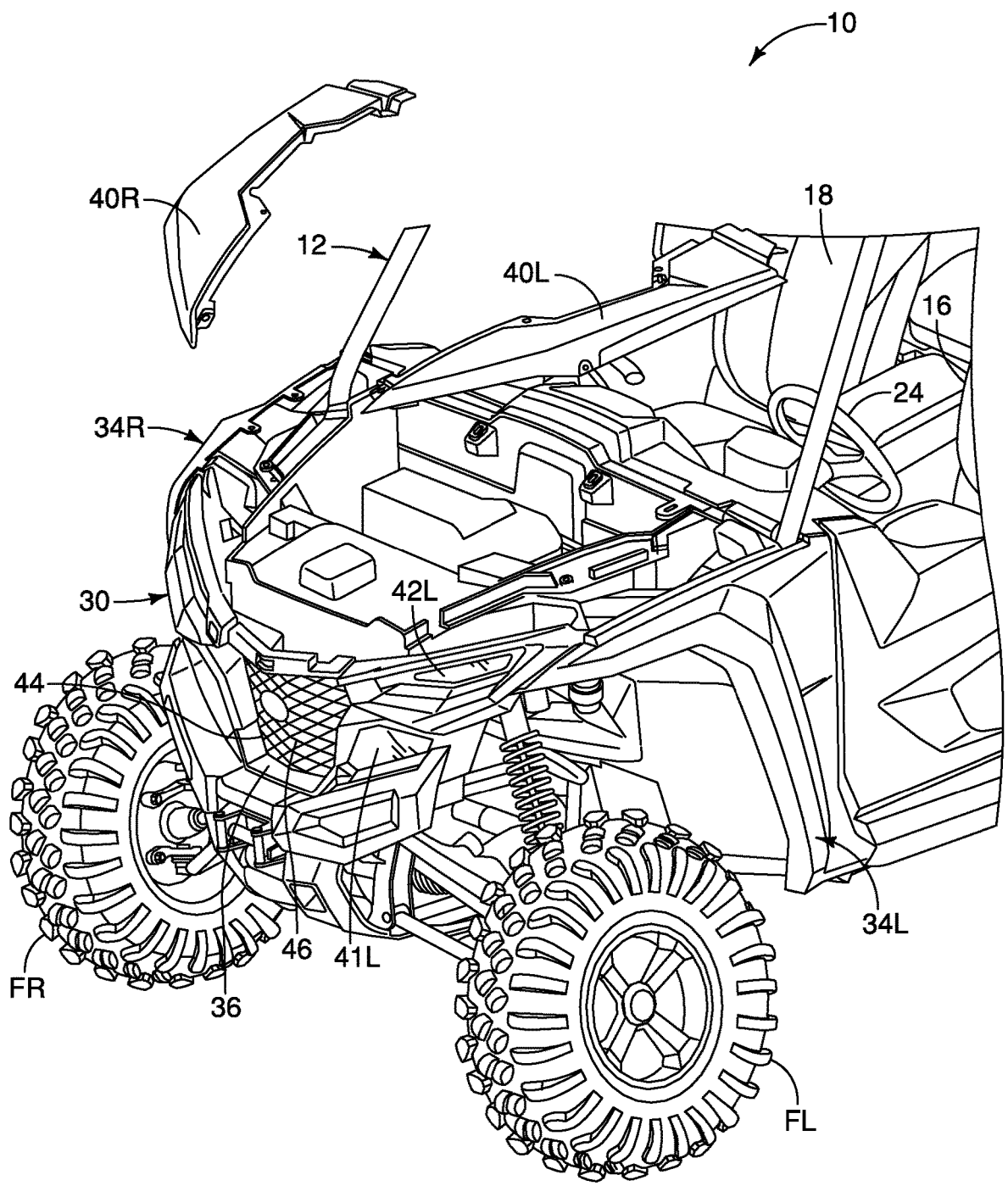
FIG. 7 is a partially exploded perspective of the front portion of the recreational off-highway vehicle illustrated in FIGS. 1 to 6.
Figure 8:
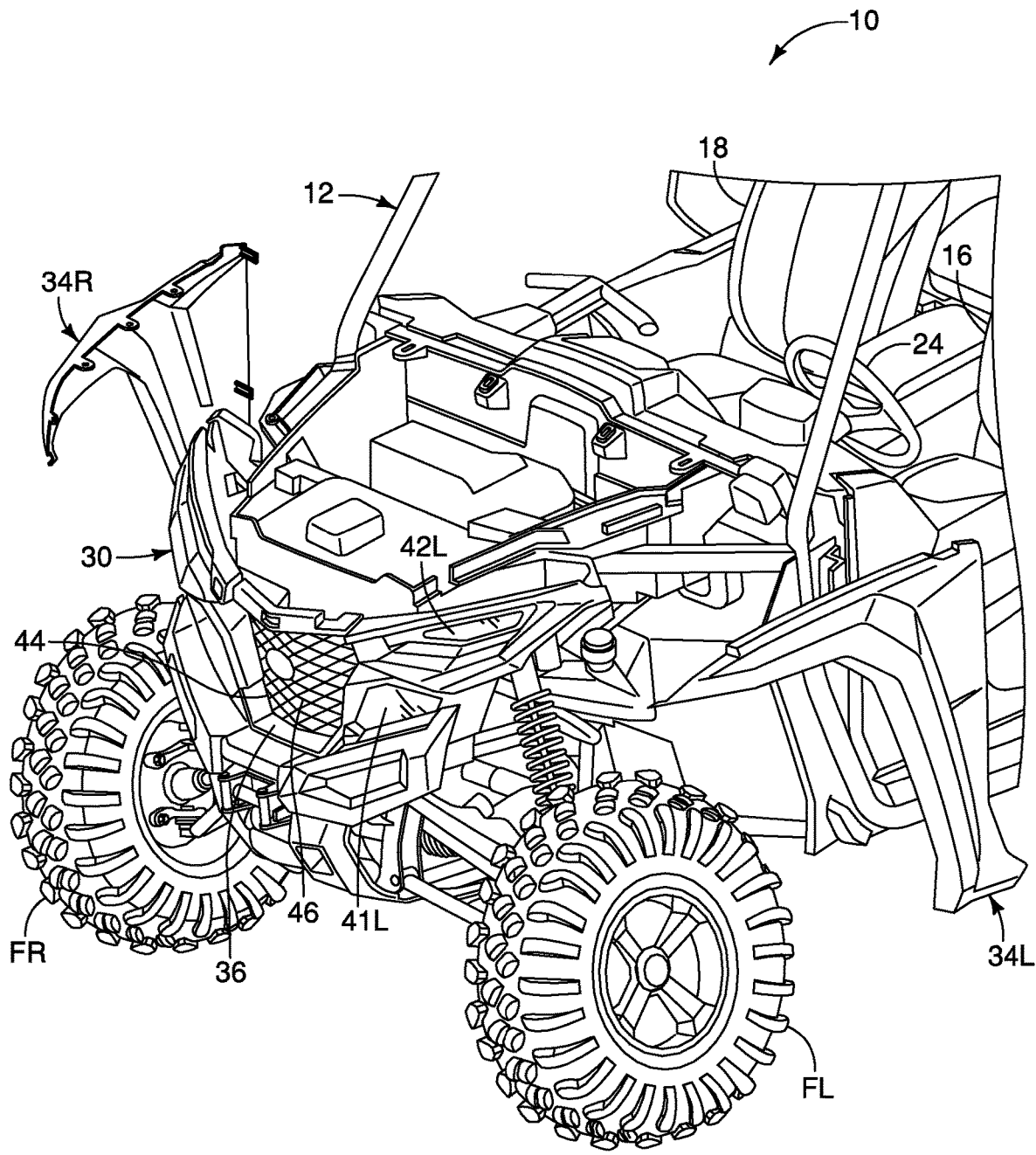
FIG. 8 is another partially exploded perspective of the front portion of the recreational off-highway vehicle illustrated in FIGS. 6 and 7 with the hood removed.
Figure 11:
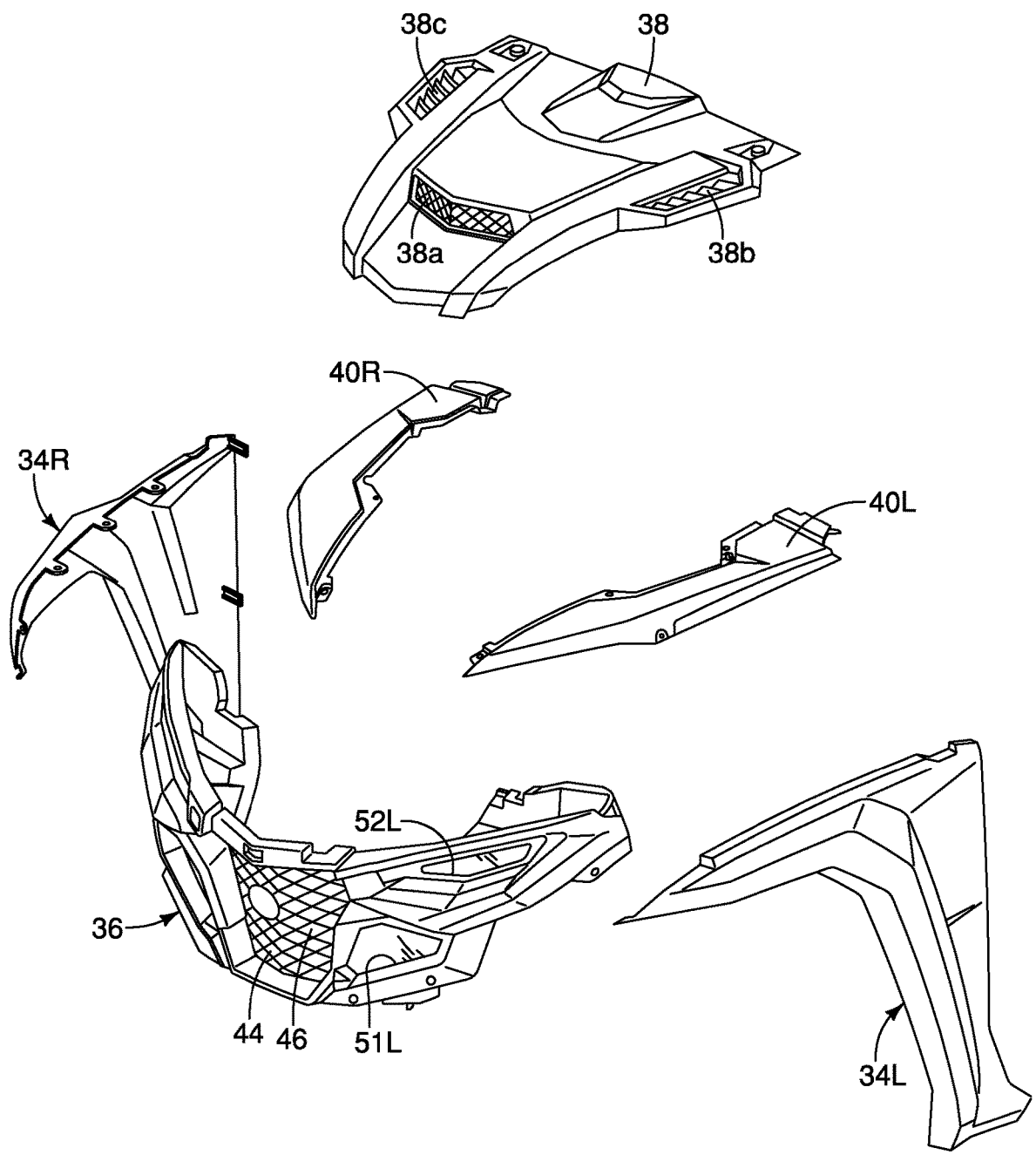
FIG. 11 is an exploded perspective of the front body portion of the recreational off-highway vehicle illustrated in FIGS. 1 to 6.
Figure 12:
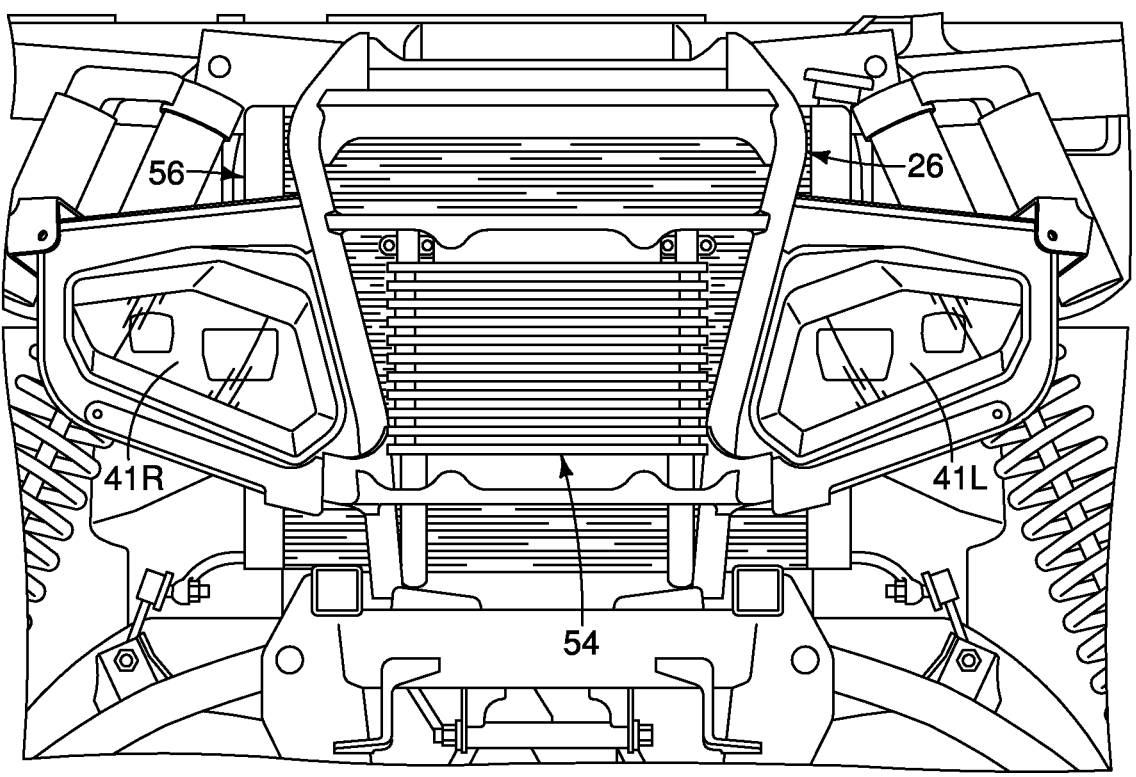
FIG. 12 is a front elevational view of the recreational off-highway vehicle illustrated in FIGS. 1 to 4 with various parts removed.

As seen in FIG. 5, the vehicle body 14 is provided to the vehicle frame 12 in a conventional manner. The vehicle frame 12 has a front frame 12A, a rear frame 12B and an intermediate frame 12C defining an open passenger compartment between the front and rear frames 12A and 12B. The front wheels FR and FL support the front frame 12A of the vehicle frame 12. The rear wheels RR and RL supports the rear frame 12B of the vehicle frame 12. As seen in FIGS. 5, 11 and 12, the vehicle 10 further comprises a front support 26 that is attached to the front frame 12A. The front support 26 is made of a plurality of hollow tubes and a plurality of brackets that are welded to each other.

As seen in FIG. 5, the vehicle 10 includes a drive source 28 that is supported on the intermediate frame 12C of the vehicle frame 12. Basically, the drive source 28 is an internal combustion engine. However, the drive source 28 can be an electric motor. Here, the drive source 28 is primarily located between the driver seat 16 and the front passenger seat 18. The first and second rear passenger seats 20 and 22 are located rearward of the drive source 28. The drive source 28 is operatively coupled to at least one of the wheels FR, FL, RR and RL which is a drive wheel. Preferably, the vehicle 10 is a four-wheel drive vehicle in which both the front wheels FR and FL and the rear wheels RR and RL or only the front wheels FR and FL are drive wheels for propelling the vehicle 10 along the ground. Of course, it will be apparent from this disclosure that only the rear wheels RR and RL can be drive wheels. Here, the drive source 28 is operatively coupled to all of the wheels FR, FL, RR and RL via a drivetrain (not shown).

The vehicle body 14 includes a plurality of body panels that are connected the vehicle frame 12. The body panels of the vehicle body 14 aid in protecting various components of the vehicle 10 and provide aesthetic features to the vehicle 10. Here, the vehicle body 14 includes a front body assembly 30 that is connected the vehicle frame 12. The front body assembly 30 includes a hood 32, a pair of front fenders 34R and 34L, and a front grille panel 36. The vehicle frame 12 includes other of body panels that will not be discussed or illustrated in detail herein for the sake of brevity. The hood 32, the front fenders 34R and 34L, and the front grille panel 36 are constructed of suitable materials that are used for body panels. For example, the hood 32, the front fenders 34R and 34L, and the front grille panel 36 can be constructed of metal panels, plastic panels, and/or fiber reinforced plastic panels.

The fenders 34R and 34L are disposed on lateral outward sides of the hood 32, respectively. The fenders 34R and 34L are mirror images of each other. The hood 32 is a separate piece from the fenders 34R and 34L and the front grille panel 36. Here, the hood 32 is made of a center hood section 38 and a pair of side hood sections 40R and 40L. The center hood section 38 of the hood 32 is either removably mounted or hingedly mounted to the vehicle frame 12 and/or other body panels. The side hood sections 40R and 40L can be fastened to the vehicle frame 12 and/or other body panels in a conventional manner (e.g., a plurality of fasteners) so that the side hood sections 40R and 40L remains attached to the vehicle 10 when the center hood section 38 of the hood 32 is removed. Alternatively, the side hood sections 40R and 40L can be fastened to the center hood section 38 in a conventional manner (e.g., a plurality of fasteners) so that the center hood section 38 and the side hood sections 40R and 40L are removably as a unit. In the illustrated embodiment, the center hood section 38 is removably mounted to other body panels using a plurality of snap fit connections. The center hood section 38 of the hood 32 includes a front vent 38a and a pair of second vents 38b and 38c.

The front support 26 supports the front grille panel 36. The front grille panel 36 is attached to the front support 26 in a conventional manner (e.g., a plurality of fasteners). The front grille panel 36 is located below the hood 32. Lateral ends of the front grille panel 36 are located between forward ends of the front fenders 34R and 34L and the side hood sections 40R and 40L. The front grille panel 36 defines a forwardly facing portion of the front body assembly 30.

In the illustrated embodiment, the vehicle 10 includes a pair of headlights 41R and 41L. The headlights 41R and 41L are located primarily at a middle point of the front grille panel 36 with respect to a vertical direction D1 of the vehicle 10. The headlights 41R and 41L are disposed inwardly of the front wheels FR and FL. Also, in the illustrated embodiment, the vehicle 10 includes a pair of driving lights 42R and 42L. The headlights 41R and 41L are larger than the driving lights 42R and 42L. Also, the driving lights 42R and 42L are mounted to provide illumination forward of the vehicle 10 and in a range beyond the high beam of the headlights 41R and 41L.

The driving lights 42R and 42L are disposed above and at least partially outward of the headlights 41R and 41L, respectively. The front support 26 supports the front grille panel 36, the headlights 41R and 41L, while the driving lights 42R and 42L supported by the front grille panel 36. In other words, the front grille panel 36 and the headlights 41R and 41L are fastened to the front support 26 such that the front grille panel 36 can be removed while the headlights 41R and 41L remain attached to the front support 26. Similarly, the headlights 41R and 41L can be removed while the front grille panel 36 remain attached to the front support 26. On the other hand, the driving lights 42R and 42L are fastened directly to the front grille panel 36.

In the illustrated embodiment, the front grille panel 36 includes an air intake area 44 defined by a plurality of intake air openings 46. As seen in FIG. 2, the air intake area 44 extends greater in the vertical direction D1 of the vehicle 10 than in a lateral vehicle direction D2 of the vehicle 10. The air intake area 44 has a lower minimum lateral width W1 that is smaller than a vertical height H of the air intake area 44. The air intake area 44 has an upper maximum lateral width W2 that is greater than the vertical height H of the air intake area 44. As seen in FIG. 2, the headlights 41R and 41L has an uppermost edge that is located below an uppermost one of the intake air openings 46 in the air intake area 44. The headlights 41R and 41L has a lowermost edge that is located above a lowermost one of the intake air openings 46 in the air intake area 44.

Figure 9:
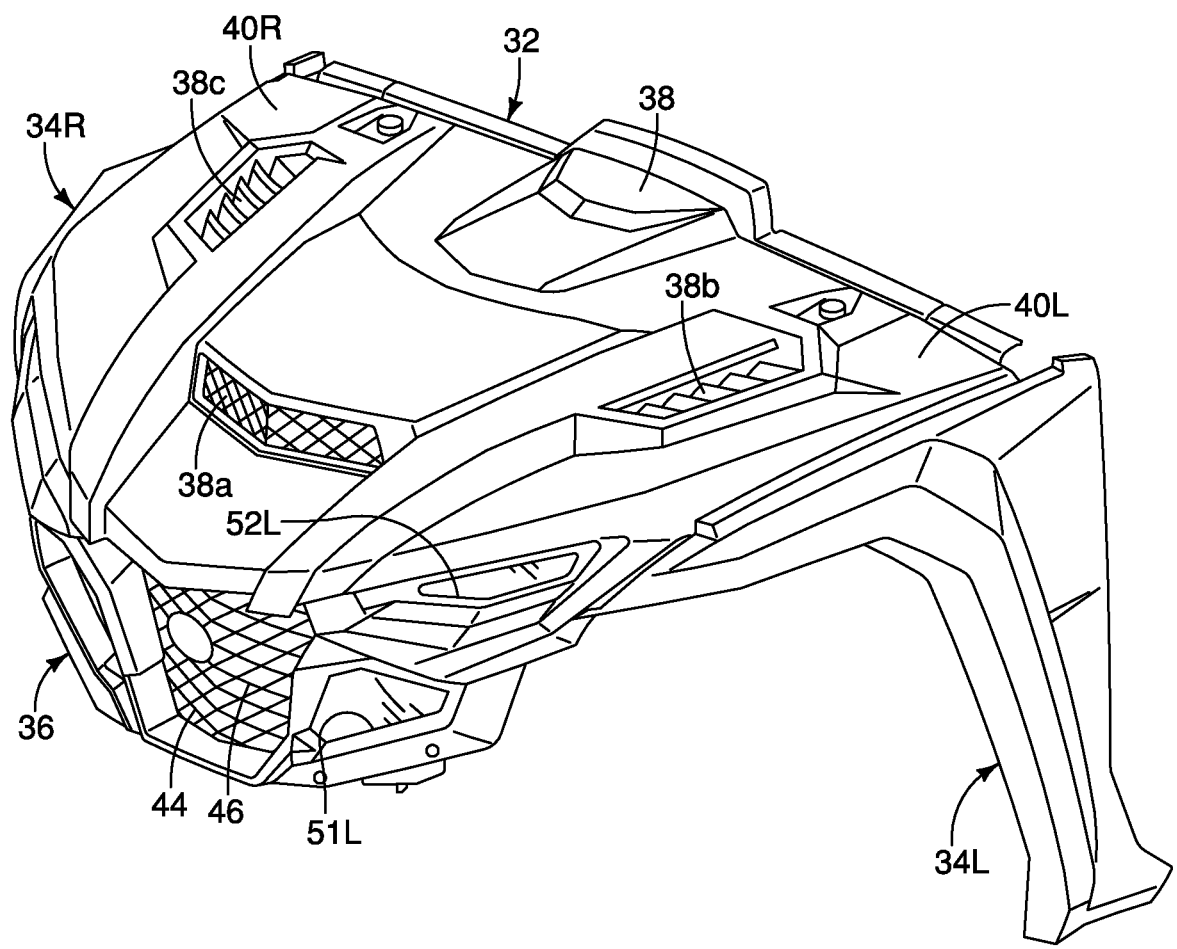
FIG. 9 is a left front perspective of a front body portion of the recreational off-highway vehicle illustrated in FIGS. 1 to 6.
Figure 10:
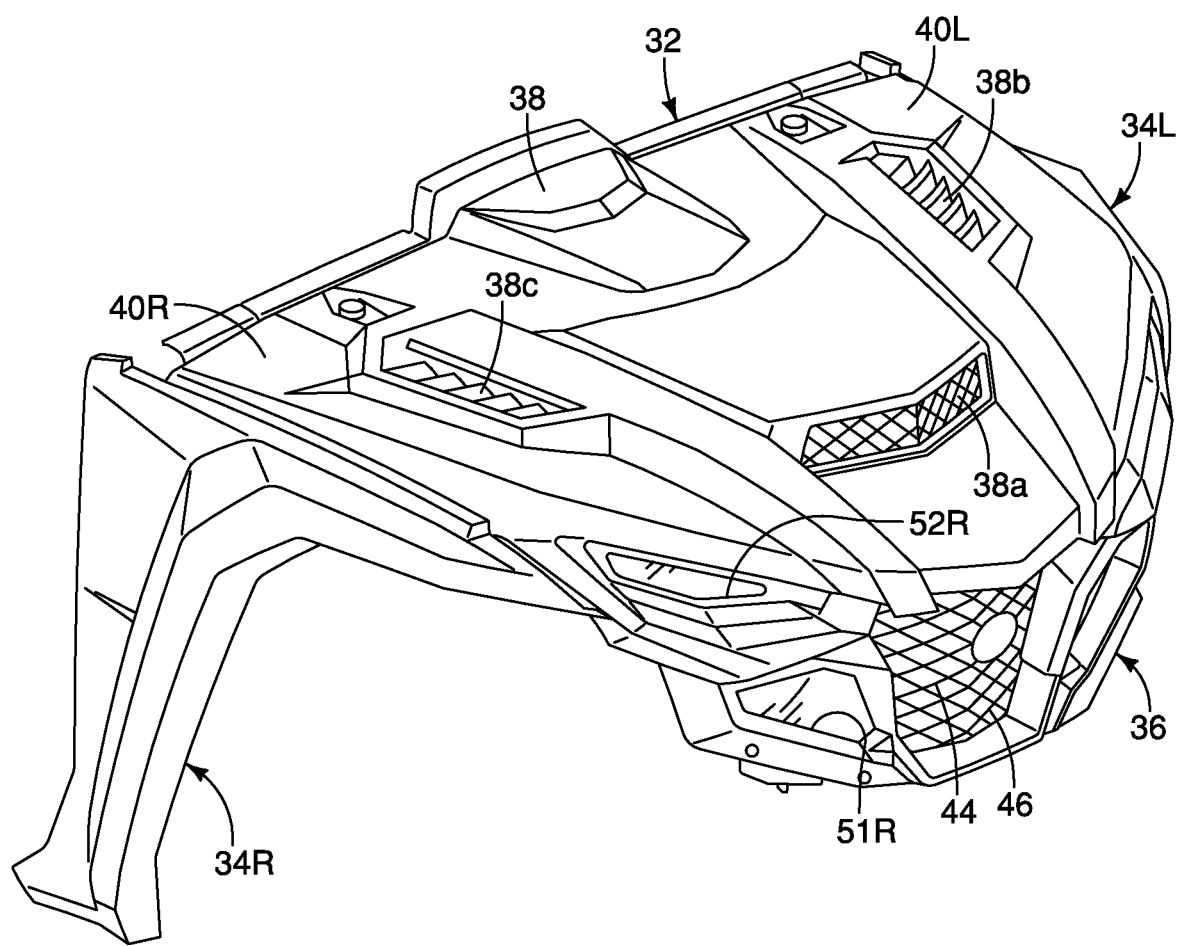
FIG. 10 is a right front perspective of a front body portion of the recreational off-highway vehicle illustrated in FIGS. 1 to 6.

As seen in FIGS. 3, 9 and 10, the front grille panel 36 has a pair of headlight openings 51R and 51L in which the headlights 41R and 41L are disposed, respectively. The front grille panel 36 has a pair of driving light openings 52R and 52L in which the driving lights 42R and 42L are disposed, respectively. In the illustrated embodiment, as seen in FIG. 3, the headlight openings 51R and 51L are located primarily at a middle point of the front grille panel 36 with respect to the vertical direction D1 of the vehicle 10. The driving light openings 52R and 52L are disposed inwardly of the front wheels FR and FL. The headlight openings 51R and 51L are larger than the driving light openings 52R and 52L.

Figure 13:
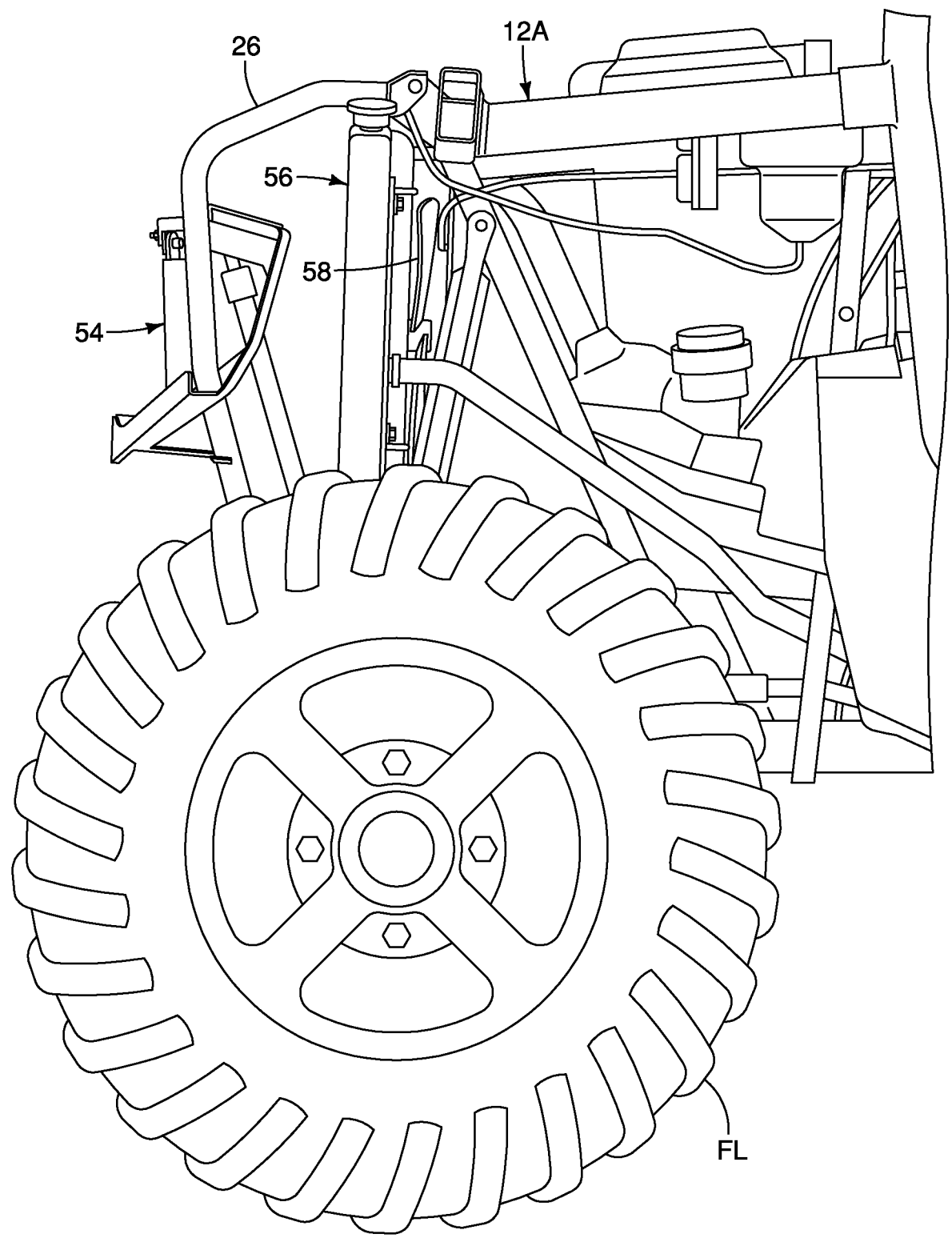
FIG. 13 is a right side elevational view of the front portion of the recreational off-highway vehicle illustrated in FIGS. 6 and 7 with various parts removed.

As seen in FIGS. 12 and 13, the vehicle 10 further comprises an oil cooler 54 that is supported on the front support 26 behind the air intake area 44 of the front grille panel 36. The oil cooler 54 is located directly behind the air intake area 44 of the front grille panel 36. In this way, air pass through the air intake area 44 of the front grille panel 36 and contact the oil cooler 54 for cooling the oil in the oil cooler 54. In the illustrated embodiment, the oil cooler 54 is located along the vertical center plane CP of the vehicle 10.

As seen in FIGS. 12 and 13, the vehicle 10 further comprises a radiator 56 and a radiator fan 58. The radiator fan 58 is supported on the front support 26 by the radiator 56. The radiator 56 and the radiator fan 58 are behind the oil cooler 54. Thus, in the illustrated embodiment, the radiator 56 and the radiator fan 58 are located along the vertical center plane CP of the vehicle 10. In this way, intake air can be drawn through the intake air openings 46 in the air intake area 44 by the radiator fan 58 such that the intake air is also drawn through the oil cooler 54 and the radiator 56.

The vehicle 10 further comprises many other conventional vehicle components, such as an accelerator pedal, a brake system, a fuel tank, an electrical system, an exhaust system, various lights, various displays, gauges, etc. that are typically provided on recreational off-highway vehicles. However, for the sake of brevity, only those vehicle components needed to understand the present invention will be illustrated and/or discussed herein.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Thus, as used herein, the singular forms "a," "an" and "the" are intended to include the plural forms as well, unless the context clearly indicates otherwise. Also, the terms "part," "section," "portion," "member" or "element" when used in the singular can have the dual meaning of a single part or a plurality of parts. Unless otherwise defined, all terms (including technical and scientific terms) used herein have the same meaning as commonly understood by one of ordinary skill in the art to which illustrative embodiments of the inventive concepts belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

It will be understood that when an element is referred to as being "connected" or "coupled" to another element, it can be directly connected or coupled to the other element or intervening elements may be present. In contrast, when an element is referred to as being "directly connected" or "directly coupled"" to another element, there are no intervening elements present. As used herein the term "and/or" includes any and all combinations of one or more of the associated listed items. Additionally, similar words used to describe the relationship between elements or layers should be interpreted in a like fashion (e.g., "between" versus "directly between", "above" versus "directly above", "below" versus "directly below", "adjacent" versus "directly adjacent," "on" versus "directly on"). Thus, components that are shown directly connected or contacting each other can have intermediate structures disposed between them unless specified otherwise.

It will be understood that, although the terms "first", "second", etc. may be used herein to describe various elements, components, regions, positions and/or sections, these elements, components, regions, positions and/or sections should not be limited by these terms. These terms are only used to distinguish one element, component, region, layer, position or section from another element, component, region, layer, position or section. Thus, a first element, component, region, position or section discussed above could be termed a second element, component, region, position or section without departing from the teachings of illustrative embodiments.

Spatially relative terms, such as "forward", "rearward", "above", "below", "beneath", "downward", "vertical", "horizontal", and "transverse" as well as any other similar spatial terms may be used herein for the ease of description to describe one element or feature's relationship to another element(s) or feature(s) of the above embodiments. These terms, as utilized to describe the present invention should be interpreted relative to a recreational off-highway vehicle on a flat horizontal surface and with to a direction in which a driver looks straight when seated on a driver's seat in a straightforward driving direction. The terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A recreational off-highway vehicle comprising:
   a vehicle frame including a front frame, a rear frame and an intermediate frame defining an open passenger compartment between the front and rear frames;
   a plurality of wheels supporting the vehicle frame, at least one of the wheels being a drive wheel;
   a drive source supported by the vehicle frame;
   a front grille panel having an air intake area defined by a plurality of intake air openings;
   a pair of headlights located primarily at a middle point of the front grille panel with respect to a vertical direction of the recreational off-highway vehicle, the headlights having an uppermost edge that is located below a location where the air intake area has a maximum lateral width; and
   a pair of driving lights disposed above and at least partially outward of the headlights, respectively, the driving lights having a lowermost edge that is located above the location where the air intake area has the maximum lateral width.

2. The recreational off-highway vehicle according to claim 1, wherein
   the front grille panel has a pair of headlight openings, the headlights being disposed in the headlight openings.

3. The recreational off-highway vehicle according to claim 1, wherein
   the uppermost edge of the headlights is located below an uppermost one of the intake air openings in the air intake area.

4. The recreational off-highway vehicle according to claim 1, wherein
   the headlights have a lowermost edge that is located above a lowermost one of the intake air openings in the air intake area.

5. The recreational off-highway vehicle according to claim 1, wherein
   the air intake area extends greater in the vertical direction than in a lateral vehicle direction of the recreational off-highway vehicle.

6. The recreational off-highway vehicle according to claim 1, wherein
   the air intake area has a lower minimum lateral width that is smaller than a vertical height of the air intake area.

7. The recreational off-highway vehicle according to claim 1, wherein
   the air intake area has an upper maximum lateral width that is greater than a vertical height of the air intake area.

8. The recreational off-highway vehicle according to claim 1, further comprising
   a front support supporting the front grille panel and the headlights.

9. The recreational off-highway vehicle according to claim 8, further comprising
   a radiator supported on the front support behind the air intake area of the front grille panel, the radiator and the air intake area of the front grille panel being located along a vertical center plane of the recreational off-highway vehicle.

10. The recreational off-highway vehicle according to claim 8, further comprising
    an oil cooler supported on the front support behind the air intake area of the front grille panel, the oil cooler and the air intake area of the front grille panel being located along a vertical center plane of the recreational off-highway vehicle.

11. The recreational off-highway vehicle according to claim 8, further comprising
a radiator fan supported on the front support behind the air intake area of the front grille panel, the radiator fan and the air intake area of the front grille panel being located along a vertical center plane of the recreational off-highway vehicle.

12. The recreational off-highway vehicle according to claim 1, wherein
the front grille panel has a pair of driving light openings in which the driving lights are disposed, respectively.

13. The recreational off-highway vehicle according to claim 1, further comprising
a front support supporting the front grille panel and the headlights, and the driving lights being supported on the front grille panel.

14. The recreational off-highway vehicle according to claim 13, further comprising
a radiator supported on the front support behind the air intake area of the front grille panel, and
a radiator fan supported on the front support by the radiator, the radiator, the radiator fan and the air intake area of the front grille panel being located along a vertical center plane of the recreational off-highway vehicle.

15. The recreational off-highway vehicle according to claim 13, further comprising
an oil cooler supported on the front support behind the air intake area of the front grille panel, the oil cooler and the air intake area of the front grille panel being located along a vertical center plane of the recreational off-highway vehicle.

16. The recreational off-highway vehicle according to claim 1, further comprising
a hood that is a separate piece from the front grille panel.

17. The recreational off-highway vehicle according to claim 16, further comprising
a pair of front fenders disposed on lateral outward sides of the hood, respectively.

18. The recreational off-highway vehicle according to claim 1, wherein
the headlights are disposed inwardly of a pair of front wheels of the wheels.

* * * * *